(12) United States Patent
Govindan et al.

(10) Patent No.: US 10,688,409 B2
(45) Date of Patent: Jun. 23, 2020

(54) FEEDBACK CONTROL OPTIMIZATION OF COUNTER-FLOW SIMULTANEOUS HEAT AND MASS EXCHANGE

(71) Applicant: Gradiant Corporation, Singapore (SG)

(72) Inventors: Prakash Narayan Govindan, Singapore (SG); Maximus G. St. John, Cambridge, MA (US); Karim M. Chehayeb, Beirut (LB); Steven Lam, Singapore (SG)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 16/268,643

(22) Filed: Feb. 6, 2019

(65) Prior Publication Data

US 2019/0209947 A1 Jul. 11, 2019

Related U.S. Application Data

(63) Continuation of application No. 15/401,948, filed on Jan. 9, 2017, now Pat. No. 10,239,765, which is a (Continued)

(51) Int. Cl.
*B01F 3/04* (2006.01)
*C02F 1/26* (2006.01)
(Continued)

(52) U.S. Cl.
CPC .............. *B01D 3/4211* (2013.01); *B01D 3/16* (2013.01); *B01D 3/346* (2013.01); (Continued)

(58) Field of Classification Search
CPC ..... C02F 1/008; C02F 1/10; C02F 1/26; C02F 1/265; B01D 3/16; B01D 3/4211; B01F 3/04078
(Continued)

(56) References Cited

U.S. PATENT DOCUMENTS 5,724,828 A 3/1998 Korenic
6,911,121 B1 6/2005 Beckman
(Continued)

FOREIGN PATENT DOCUMENTS

WO 2005/033585 A2 4/2005
WO 2012/159203 A1 11/2012

OTHER PUBLICATIONS

U.S. Patent and Trademark Office, "International Search Report and Written Opinion" for PCT/US14/71146 (dated Mar. 24, 2015).

*Primary Examiner* — Robert A Hopkins
(74) *Attorney, Agent, or Firm* — Modern Times Legal; Robert J. Sayre

(57) ABSTRACT

A counter-flow simultaneous heat and mass exchange device is operated by directing flows of two fluids into a heat and mass exchange device at initial mass flow rates where ideal changes in total enthalpy rates of the two fluids are unequal. At least one of the following state variables in the fluids is measured: temperature, pressure and concentration, which together define the thermodynamic state of the two fluid streams at the points of entry to and exit from the device. The flow rates of the fluids at the points of entry and/or exit to/from the device are measured; and the mass flow rate of at least one of the two fluids is changed such that the ideal change in total enthalpy rates of the two fluids through the device are brought closer to being equal.

7 Claims, 9 Drawing Sheets

Related U.S. Application Data continuation of application No. 14/574,968, filed on Dec. 18, 2014, now Pat. No. 9,579,590.

(60) Provisional application No. 61/917,847, filed on Dec. 18, 2013.

(51) Int. Cl.
| | |
|---|---|
| *B01D 3/42* | (2006.01) |
| *F28F 27/00* | (2006.01) |
| *F28B 1/02* | (2006.01) |
| *F28C 1/02* | (2006.01) |
| *C02F 1/00* | (2006.01) |
| *B01D 3/16* | (2006.01) |
| *C02F 1/10* | (2006.01) |
| *F28B 5/00* | (2006.01) |
| *F28D 21/00* | (2006.01) |
| *B01D 3/34* | (2006.01) |
| *C02F 1/04* | (2006.01) |
| *C02F 103/08* | (2006.01) |
| *C02F 103/10* | (2006.01) |

(52) U.S. Cl.
CPC .......... *B01F 3/04078* (2013.01); *C02F 1/008* (2013.01); *C02F 1/10* (2013.01); *C02F 1/26* (2013.01); *C02F 1/265* (2013.01); *F28B 1/02* (2013.01); *F28B 5/00* (2013.01); *F28C 1/02* (2013.01); *F28D 21/0015* (2013.01); *F28F 27/00* (2013.01); *C02F 1/043* (2013.01); *C02F 2103/08* (2013.01); *C02F 2103/10* (2013.01); *C02F 2209/02* (2013.01); *C02F 2209/03* (2013.01); *C02F 2209/38* (2013.01); *C02F 2209/40* (2013.01); *C02F 2303/04* (2013.01); *F28D 2021/0064* (2013.01); *F28F 2200/00* (2013.01); *F28F 2250/104* (2013.01)

(58) Field of Classification Search
USPC ..... 261/117; 95/227, 228; 96/243, 244, 251, 96/252, 253, 294
See application file for complete search history.

(56) References Cited

U.S. PATENT DOCUMENTS

| | | | |
|---|---|---|---|
| 8,252,092 | B2 | 8/2012 | Govindan et al. |
| 8,292,272 | B2 | 10/2012 | Elsharqawy |
| 8,496,234 | B1 | 7/2013 | Govindan et al. |
| 8,523,985 | B2 | 9/2013 | Govindan et al. |
| 8,647,477 | B2 | 2/2014 | Govindan et al. |
| 9,266,747 | B1 | 2/2016 | Sparrow et al. |
| 2014/0367871 | A1 | 12/2014 | Govindan et al. |

FEEDBACK CONTROL OPTIMIZATION OF COUNTER-FLOW SIMULTANEOUS HEAT AND MASS EXCHANGE

RELATED APPLICATION

This application is a continuation of U.S. application Ser. No. 15/401,948, filed 9 Jan. 2017, which is a continuation of U.S. application Ser. No. 14/574,968, filed 18 Dec. 2014, the entire contents of which are incorporated herein by reference.

This application also claims the benefit of U.S. Provisional Application No. 61/917,847, filed 18 Dec. 2013, the entire content of which is incorporated herein by reference.

BACKGROUND

In this century, the shortage of fresh water will surpass the shortage of energy as a global concern for humanity; and these two challenges are inexorably linked, as explained, for example, in the "Special Report on Water" in the 20 May 2010 issue of *The Economist*. Fresh water is one of the most fundamental needs of humans and other organisms; each human needs to consume a minimum of about two liters per day. The world also faces greater freshwater demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. Despite the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only a fraction of all water on Earth as available fresh (non-saline) water.

Moreover, the earth's water that is fresh and available is not evenly distributed. For example, heavily populated countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive.

Additionally, water can be advantageously extracted from contaminated waste streams (e.g., from oil and gas production) both to produce fresh water and to concentrate and reduce the volume of the waste streams, thereby reducing pollution and contamination and reducing costs.

Nevertheless, many of the existing processes for producing fresh water from seawater (or from brackish water or contaminated waste streams) require massive amounts of energy. Reverse osmosis (RO) is currently the leading desalination technology. In large-scale plants, the specific electricity required can be as low as 4 kWh/m$^3$ at 30% recovery, compared to the theoretical minimum of around 1 kWh/m$^3$; smaller-scale RO systems (e.g., aboard ships) are less efficient.

Other existing seawater desalination systems include thermal-energy-based multi-stage flash (MSF) distillation, and multi-effect distillation (MED), both of which are energy- and capital-intensive processes. In MSF and MED systems, however, the maximum brine temperature and the maximum temperature of the heat input are limited in order to avoid calcium sulfate, magnesium hydroxide and calcium carbonate precipitation, which leads to the formation of soft and hard scale on the heat transfer equipment.

Humidification-dehumidification (HDH) desalination systems include a humidifier and a condenser as their main components and use a carrier gas (e.g., air) to desalinate brine streams. A simple version of this technology includes a humidifier, a condenser, and a heater to heat the brine stream. In the humidifier, hot brine comes in direct contact with dry air, and this air becomes heated and humidified. In the condenser, the heated and humidified air is brought into (indirect) contact with a coolant (for example, cold brine) and gets dehumidified, producing pure water and dehumidified air. The HDH process operates at lower top brine temperatures than MSF and MED systems, precipitation of scaling components is hence avoided to some extent.

Another approach, described in U.S. Pat. No. 8,119,007 B2 (A. Bajpayee, et al.), uses directional solvent that directionally dissolves water but does not dissolve salt. The directional solvent is heated to dissolve water from a salt solution into the directional solvent. The remaining highly concentrated salt water is removed, and the solution of directional solvent and water is cooled to precipitate substantially pure water out of the solution.

The present inventor was also named as one of the inventors on the following patent applications that include additional discussion of HDH and other processes for purifying water: U.S. application Ser. No. 12/554,726, filed 4 Sep. 2009; U.S. application Ser. No. 12/573,221, filed 5 Oct. 2009; U.S. application Ser. No. 13/028,170, filed 15 Feb. 2011; and U.S. application Ser. No. 13/241,907, filed 23 Sep. 2011; U.S. application Ser. No. 13/550,094, filed 16 Jul. 2012; U.S. application Ser. No. 13/916,038, filed 12 Jun. 2013; and U.S. application Ser. No. 13/958,968, filed 5 Aug. 2013.

SUMMARY

Apparatus and methods for counter-flow simultaneous heat and mass exchange are described herein. Various embodiments of the apparatus and methods may include some or all of the elements, features and steps described below.

In an embodiment of the method, a counter-flow simultaneous heat and mass exchange device is operated by directing flows of two fluids into a heat and mass exchange device at initial mass flow rates where ideal changes in total enthalpy rates of the two fluids are unequal. At least one of the following state variables in the fluids is measured by one or more sensors: temperature, pressure and concentration, which together define the thermodynamic state of the two fluid streams at the points of entry to and exit from the device. The flow rates of the fluids at the points of entry and/or exit to/from the device are measured; and the mass flow rate of at least one of the two fluids is changed such that the ideal change in total enthalpy rates of the two fluids through the device are brought closer to being equal.

The methods and apparatus allow operation of a heat and mass exchange device so that it always operates optimally or near optimally from the perspective of thermodynamic efficiency by controlling flows of the fluids by controlling flow controllers, such as pumps, blowers and valves in the system. These methods and apparatus can be used, e.g., for heat and mass exchange in a humidification-dehumidification process for producing fresh water from an aqueous source composition that includes dissolved species.

Figure 1:
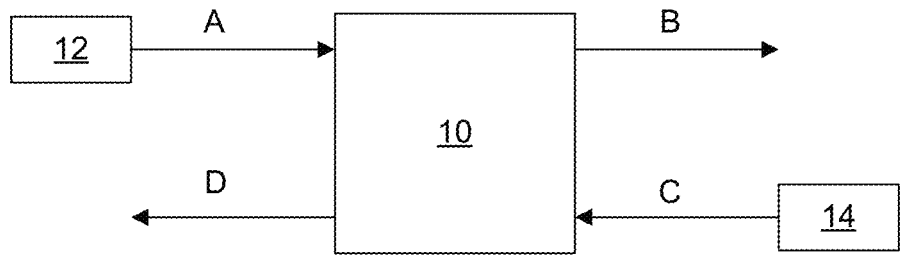
FIG. 1 is a schematic illustration of a counter-flow heat exchanger.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.).

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Dependent Versus Independent Heat and Mass Exchange Devices

Dependent heat and mass exchange devices are described herein.

An "independent" heat and mass exchange device has inlet states that do not depend on the operation of the device (e.g., choice of flow rates). In other words, an independent heat and mass exchange device has inlet states that depend only on external conditions.

A "dependent" heat and mass exchange device, in contrast, has inlet states that depend on the operation of the device (e.g., the choice of flow rates). This dependency usually exists because the outlets of the heat-and-mass-exchange (HME) apparatus serve as or are coupled with the inlets to other HME devices, and the outlets of the coupled HME devices can serve as or be coupled with the inlets of the HME device in question. For example, in a humidification-dehumidification (HDH) system, the condenser and humidifier are dependent HME devices as, for example, varying the flow rate of air in the condenser affects the operation of the humidifier (as it is the same flow rate) and so affects the outputs at the outlets of the humidifier, in particular, at the air outlet. The air leaving the humidifier enters the condenser; so the input at the inlet to the condenser changes with a changing of the flow rate of air in the condenser.

When controlling an independent HME device, one need only determine the states of the inputs and calculate the heat capacity ratio (HCR), and set the new mass flow rate ratio (MR) to $MR_{new}=MR_{old}/HCR_d$. $HCR_d$ is the modified heat capacity rate ratio and is further defined, below There is no need for iteration, as changing the flow rate will not affect the inlet states. In contrast, when controlling a dependent HME device, the process is carried out iteratively, as changing the flow rate will change the inlet states, and so will affect the value of $HCR_d$.

Simplified Illustration of Heat-and-Mass-Exchange Optimization

In the illustration of FIG. 1, two fluids are passed in counter-flow through a heat and mass exchanger 10 such that there is heat and mass exchange between the two fluids, wherein $|\Delta\dot{H}_{AB}|>0$, $|\Delta\dot{H}_{CD}|>0$, and $|\Delta\dot{H}_{AB}|\cong|\Delta\dot{H}_{CD}|$, and wherein $\dot{m}_A<\dot{m}_B$ and $\dot{m}_C>\dot{m}_D$, where $\Delta\dot{H}$ is the energy loss/gained/transfer from a fluid from a first or second fluid source 12 or 14 with the heat and mass exchanger 10, and where $\dot{m}$ is the mass flow rate. In one example, a first fluid from the first source 12 is moist air being condensed/dehumidified, while a second fluid from the second source 14 is pure water being used to dehumidify the first fluid.

Figure 2:
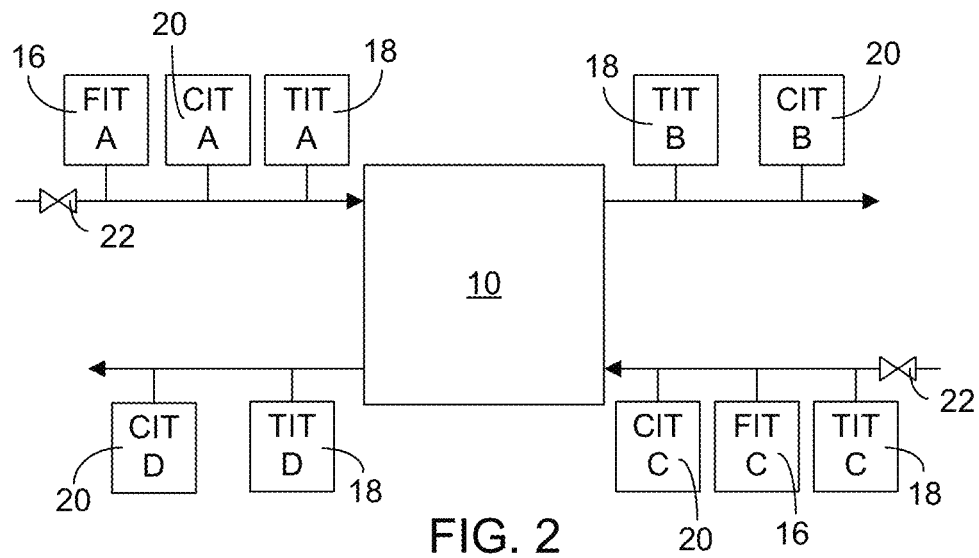
FIG. 2 illustrates the flow, temperature, and concentration indicator transmitters in the heat exchanger of FIG. 1.

In the illustration FIG. 2, a configuration of sensors including flow indicator transmitters (FIT) 16, temperature indicator transmitters (TIT) 18, and concentration indicator transmitters (CIT) 20 are mounted in fluid lines A and C upstream and in fluid lines B and D downstream from the heat and mass exchanger 10 in the two fluid conduits. Equivalently, sensors/transmitters (e.g., temperature transmitter, flow transmitter and concentrator transmitter) without indicators can also be used. The flow of the fluids through the conduits is governed (i.e., increased or decreased) by respective flow control devices 22 in the input conduits in response to the flow, temperature, and/or concentration signals received from the sensors/transmitters 16, 18 and 20. Optionally, pressure indicator transmitters or pressure transmitters may also be included to measure pressure in the conduits; and those readings may be incorporated by the control system as a basis for controlling the flow of the fluid(s) with the flow control device(s) 22.

Figure 3:
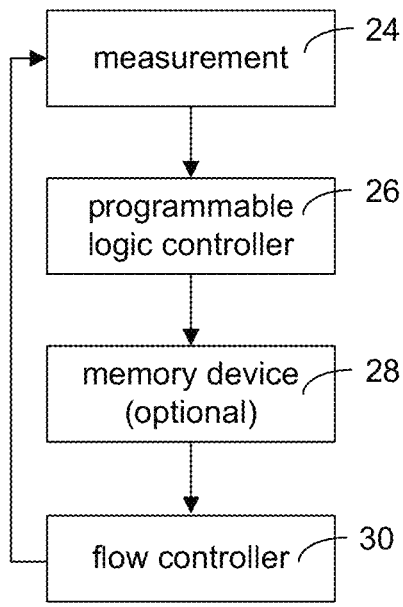
FIG. 3 is a flow chart illustrating the steps in a method operating the system.

A flow chart of the control operation is shown in FIG. 3, starting with the measurements 24 taken by the FIT 16, TIT 18, and CIT 20. These transmitters communicate their measurement values via signals to an automated controller, such as a programmable logic controller (PLC) 26, in which the equations for flow control are stored. Values calculated by the PLC can optionally then be transmitted to a memory device (e.g., a computer hard drive) 28 for nontransitory storage; and a signal including desired flow rates is transmitted to the flow control device(s) 22. The process is then repeatedly reiterated, re-commencing with new measurements taken by the FIT 16, TIT 18, and CIT 20.

The target for the flow control is to achieve the following condition: $\Delta\dot{H}_{max,1}=\Delta\dot{H}_{max,2}$, where $\Delta\dot{H}_{max,1}$ and $\Delta\dot{H}_{max,2}$ represent the maximum possible change in total enthalpy rates for the first and second fluids. Accordingly, for the heat and mass exchange device in FIGS. 1 and 2, the preceding equation can be expanded as $\dot{m}_A h_A - \dot{m}_B^* h_B^* = \dot{m}_D^* h_D^* - \dot{m}_C h_C$, where $h_A$ is specific enthalpy evaluated at the actual state of the first fluid from the first source 12, which can be defined by the parameters, temperature in line A ($T_A$), concentration in line A ($C_A$), and pressure in line A ($P_A$); $h_B^*$ is specific enthalpy evaluated at the ideal state of the first fluid from the first source 12 at the exit of the device, which can be defined by the parameters, temperature in line C ($T_C$), concentration at saturation ($C_{sat}$) and pressure in line B ($P_B$); $h_D^*$ is specific enthalpy evaluated at the ideal state of fluid 2 (which can be defined by the parameters, $T_A$ and $P_D$); $h_C$ is specific enthalpy evaluated at the ideal state of fluid 2 (which can be defined by the parameters, $T_C$ and $P_C$); and $\dot{m}^*$ is the ideal mass flow rate at the outlet.

Direct Contact Heat and Mass Exchangers

Figure 4:
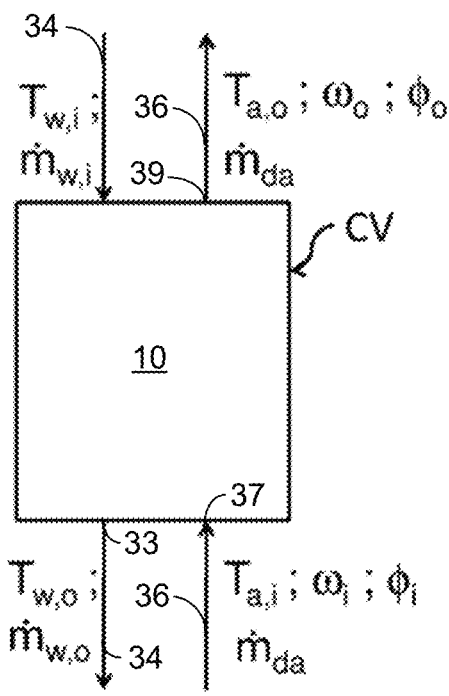
FIG. 4 is a schematic illustration of a counter-flow cooling tower.

Next, we consider a counter-flow cooling tower serving as the heat and mass exchanger and as a control volume, CV (shown in FIG. 4), in which a first fluid stream 34 is salt water and a second stream 36 is a mixture of air and water vapor. Because all of the dry air that enters the device in the humid air stream 36 leaves in the humid air stream 36, the mass flow rate of dry air is constant, as reflected in the following equation:

$$\dot{m}_{da}=\dot{m}_{da,i}=\dot{m}_{da,o}, \quad (1)$$

where in is mass; da is dry air; I is input; and o is output.

A mass balance on the water in the cooling tower 10 gives the mass flow rate of the water leaving the humidifier in the water stream 34 via the following equation:

$$\dot{m}_{w,o}=\dot{m}_{w,i}-\dot{m}_{da}(\omega_{a,o}-\omega_{a,i}), \quad (2)$$

where w is the water; a is the air stream; and ω is the humidity ratio kg of vapor per kg of dry air in the moist air mixture).

In order to determine the maximum possible change in enthalpy rate, we determine whether the air stream 36 or the water stream 34 is the hot (warmer) stream.

When the water 34 enters hotter than the air 36, the ideal condition that the water stream 34 can attain is that the temperature at the exit of the water stream equals the wet-bulb temperature of the air stream 36 at the air-stream inlet 37. This equivalence corresponds to the enthalpy driving force, which is just the enthalpy potential difference between the two streams 34 and 36 driving the heat and mass transfer, becoming zero at the exit 33 of the water stream 34. The ideal condition that the moist air stream can reach is saturation at the inlet temperature of the water stream 34 and is a limit imposed by the rate processes ($T_{a,o} \leq T_{w,i}$). When the air stream 36 enters the condenser 10 hotter than the water stream 34, the ideal conditions that can be attained by the air stream 36 and the water stream 34 differ from those in the case with hot water entering the heat and mass exchanger 10. These conditions again correspond to the driving enthalpy difference becoming zero for the respective streams.

Based on the above discussion, the effectiveness definition of a counter-flow direct contact heat and mass exchange (HME) device with hot water entering is written as follows. The denominator of the term on the right hand side represents the ideal change in total enthalpy rate.

Case I, $\Delta\dot{H}_{max,w}<\Delta\dot{H}_{max,a}$:

$$\varepsilon = \frac{\dot{m}_{w,i}h_{w,i} - \dot{m}_{w,o}h_{w,o}}{\dot{m}_{w,i}h_{w,i} - \dot{m}_{w,o}h_{w,o}^{ideal}} \quad (3)$$

Case II, $\Delta\dot{H}_{max,w} > \Delta\dot{H}_{max,a}$:

$$\varepsilon = \frac{\dot{m}_{da}(h_{a,o} - h_{a,i})}{\dot{m}_{da}(h_{a,o}^{ideal} - h_{a,i})} \quad (4)$$

Note that the First Law for the cooling tower 10 gives:

$$0 = \underbrace{\dot{m}_{da}(h_{a,i} - h_{a,o})}_{\Delta\dot{H}_a} + \underbrace{\dot{m}_{w,i}h_{w,i} - \dot{m}_{w,o}h_{w,o}}_{\Delta\dot{H}_w}, \quad (5)$$

where $\Delta\dot{H}_w$ is the change in total enthalpy rate for the feed water stream 34 and $\Delta\dot{H}_a$ is the change in total enthalpy rate of the moist air stream 36. One can similarly derive the effectiveness definition when at the inlet 37 where the hot air stream 36 enters the cooling tower 10.

Figure 5:
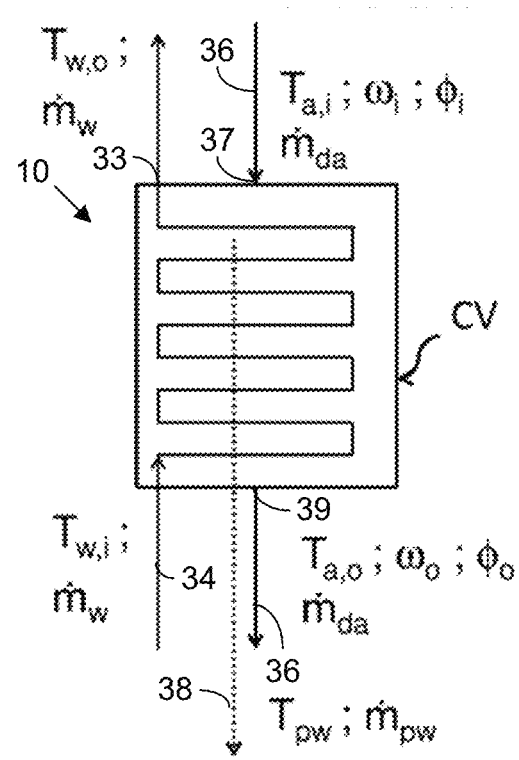
FIG. 5 is a schematic illustration of a counter-flow condenser.

Indirect Contact Heat and Mass Exchangers:

Now consider a counter-flow condenser serving as the heat and mass exchanger 10 (as shown in FIG. 5) in which one fluid stream 34 is pure water and the other stream 36 is a mixture of air and water vapor. The air-vapor-mixture stream 36 is transferring heat to the water stream 34. In this process, some of the water vapor in the mixture 36 condenses out and forms a separate condensate stream 38. Since all of the dry air in the air stream 36 and all of the water in the other fluid stream 34 that enters the condenser 10 also leaves the condenser 10, the mass flow rate of dry air and mass flow rate of the water is constant, as reflected by the following equations:

$$\dot{m}_{da} = \dot{m}_{da,i} = \dot{m}_{da,o}, \text{ and} \quad (6)$$

$$\dot{m}_{w,o} = \dot{m}_{w,i}. \quad (7)$$

The mass flow rate of the condensed water 38 can be calculated using the following simple mass balance:

$$\dot{m}_{pw} = \dot{m}_{da}(\omega_{a,i} - \omega_{a,o}). \quad (8)$$

To calculate the maximum total enthalpy rate change possible, the inlet temperatures and mass flow rates are determined. As explained before, the ideal condition corresponds to the enthalpy driving force becoming zero at the exit of the water stream 34 or at the exit of the air stream 36. The ideal condition that the air stream 36 can reach at the exit 39 is saturation at the inlet temperature of water. The water can at best reach the dry bulb temperature of the air at its inlet 37. Again, this corresponds to the enthalpy driving force reaching zero at the air inlet 37.

Based on the above discussion, the effectiveness definition of a counter-flow indirect contact HME device 10 is as follows. The denominator of the term on the right-hand side represents the ideal change in enthalpy rate in the following equations:

Case I, $\Delta\dot{H}_{max,w} < \Delta\dot{H}_{max,a}$:

$$\varepsilon = \frac{h_{w,i} - h_{w,o}}{h_{w,i} - h_{w,o}^{ideal}}; \quad (9)$$

Case II, $\Delta\dot{H}_{max,w} > \Delta\dot{H}_{max,a}$:

$$\varepsilon = \frac{\dot{m}_{da}(h_{a,o} - h_{a,i}) - \dot{m}_{pw}h_{pw}}{\dot{m}_{da}(h_{a,o}^{ideal} - h_{a,i}) - \dot{m}_{pw}h_{pw}}. \quad (10)$$

Note that the First Law for the condenser can be expressed as follows:

$$0 = \underbrace{\dot{m}_{da}(h_{a,i} - h_{a,o}) + \dot{m}_{pw,i}h_{pw,i} - \dot{m}_{pw,o}h_{pw,o}}_{\Delta\dot{H}_a} + \underbrace{\dot{m}_w(h_{w,i} - h_{w,o})}_{\Delta\dot{H}_w}, \quad (11)$$

where $\Delta\dot{H}_w$ is the change in total enthalpy rate for the feed water stream 34, and $\Delta\dot{H}_a$ is the change in total enthalpy rate of the moist air stream 36.

Overview of HDH System

Figure 6A:
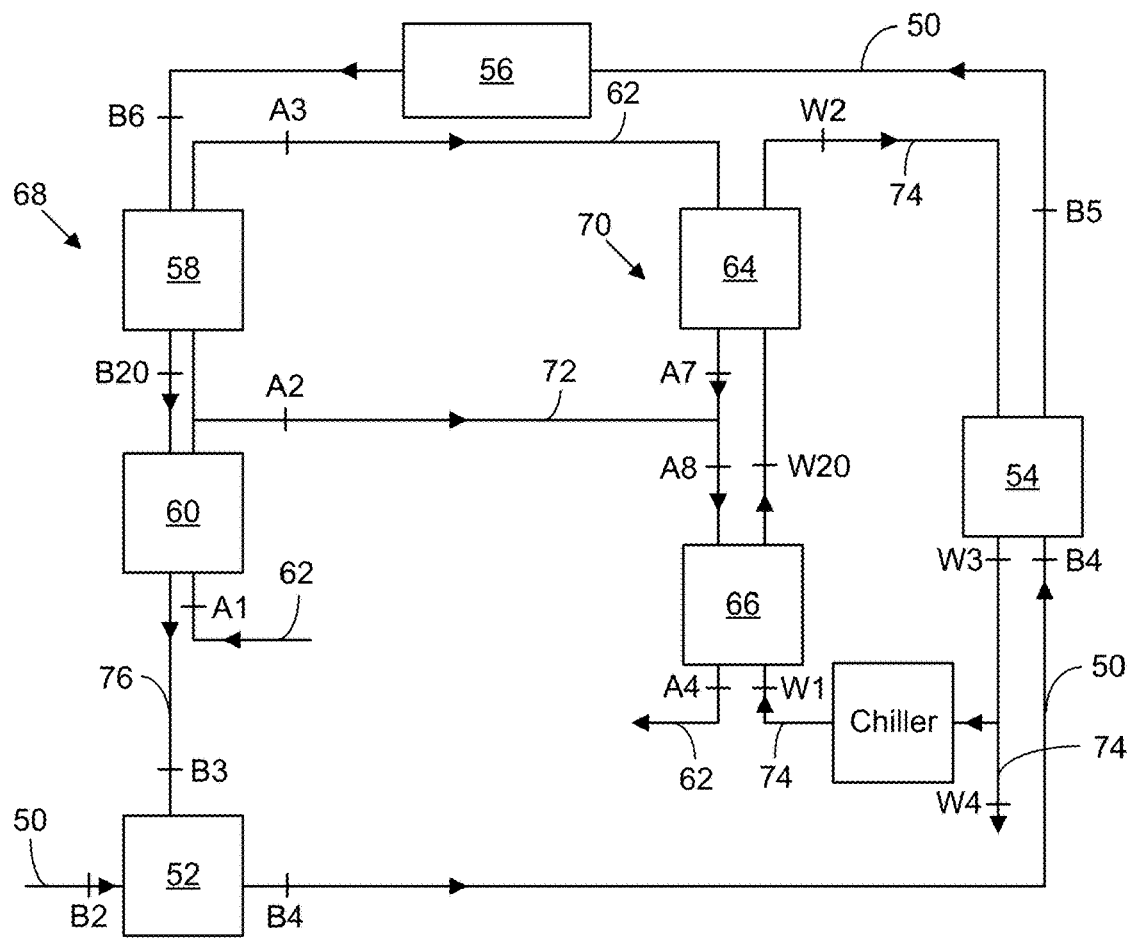
FIG. 6a is a schematic illustration of a humidification-dehumidification (HDH) system with the various positions labeled where system parameters are measured and with flow dynamics illustrated.

In the embodiment, as shown in FIG. 6a, an aqueous feed 50 in the form of fracking or produced water (from oil or gas production) is fed into an intermediate brine holding tank 52, from where it is fed through a pre-heating heat exchanger 54 and then through a second heat exchanger 56 in which the aqueous feed 50 receives heat transferred from a boiler, before the heated aqueous feed is sprayed into a humidifier 68, as described in US 2013/0015051 A1, where pure water is vaporized from the aqueous feed 50. The aqueous feed 50 is circulated through the device via passages through liquid conduits that join the components of the system. In other embodiments, the humidifier stages 58 and 60 can be bubble-column humidifiers, as described in U.S. application Ser. No. 13/916,038.

Figure 6B:
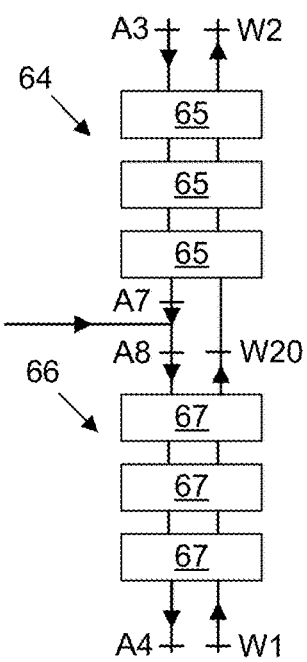
FIG. 6b is a schematic illustration of a condenser from the HDH system of FIG. 6b, wherein the condenser includes two stages, with each stage having three trays.

Ambient air 62 is also pumped via a flow controller, such as a fan or pump, through the humidifier stages 58 and 60 and serves as a carrier gas for the vaporized water in the humidifier stages 58 and 60. The humidified carrier gas is then passed through a carrier-gas conduit and fed through a two-stage bubble-column condenser 64 and 66, as described in US 2013/0074694 A1, and cooled therein to precipitate the water. In the embodiment of FIG. 6b, each of the condenser stages 64 and 66 includes a plurality of bubble-column trays 65 and 67. Trays 65/67 in the same stage 64/66 are under the same flow rates of water and air (and are held at a common, fixed temperature), while the mass flow rate of air (and temperature) changes as you move between stages 64 and 66. An additional intermediate stream of the humidified carrier gas is extracted from the humidifier 68 and injected at an intermediate location in the condenser 70 via an intermediate exchange conduit 72. The precipitated water 74 is circulated via a flow controller (e.g., a pump) from the condenser 70, through the preheating heat exchanger 54 (where heat from the precipitated water 74 is transferred to the aqueous feed 50). Respective portions of the precipitated water 74 are then (a) fed to the boiler, (b) removed for delivery to the customer, and (c) recirculated to the bubble-column condenser 70.

Meanwhile, the brine 76 remaining in the humidifier 68 from the aqueous feed 50 after water is evaporated therefrom is discharged from the humidifier via a brine outlet and fed through a crystallizer, a sludge thickener, and a filter press to produce a salt product that is removed from the system and a brine discharge that is directed into the brine holding tank 52 (and recirculated).

The humidifier 68, in this embodiment, is a dual-column bubble-column humidifier, and the condenser 70 is a bubble-column dehumidifier. The humidified carrier gas 62 from the humidifier 68 is fed into the condenser 70 at the lowest section of the condenser 70 (from the top of the humidifier 68) and at an intermediate exchange conduit 72 (from an intermediate position of the humidifier 68). Water is precipitated from the carrier gas 62 as it cools while rising through the stages 66 and 64 of the bubble-column condenser 70 and collected for productive use or for release. Meanwhile, the dehumidified carrier gas is released from the top of the condenser 70 after passing through stage 66.

Figure 7:
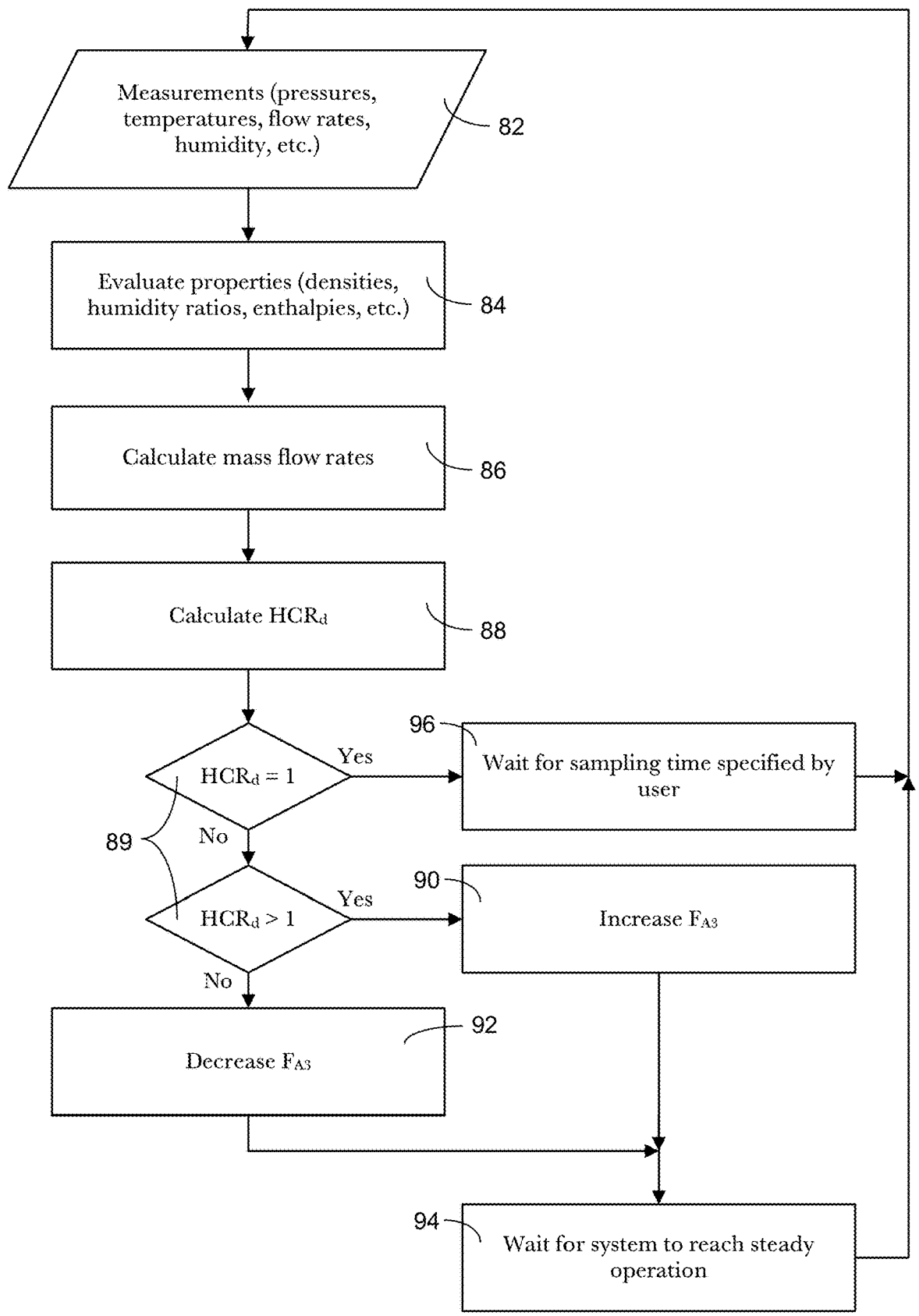
FIG. 7 is a flow chart for an HDH method FIG. 6a without intermediate extraction.

Control Algorithm for HDH (Operation with One Mass Flow Rate Ratio):

With reference to FIG. 6*a*, in a system without extraction or injection, where the feed flow rate ($\dot{m}_{B4}$) and the fresh water flow rate ($\dot{m}_{H2}$) are specified, there is flexibility in choosing the air flow rate ($\dot{m}_{A1}=\dot{m}_{A3}$) in order to get $HCR_d=1$ (or within a specified margin of error above or below 1, wherein the specified margin of error may match the potential error due to the accuracy of the sensor(s) used), and hence maximum energy efficiency (subscripts for the various parameters in this section represent the various points in the flow paths, as labeled in FIG. 6*a*, where the specified properties can be measured using installations of the various sensors/transmitters specified above). As shown in the general flowchart of FIG. 7 for N=0 (with reference to the apparatus of FIG. 6*a*), where N is the number of extractions, the first step in determining this flow rate is by measuring 82 the following parameters via sensors located at the specified positions in order to fully determine the thermodynamic states of points W1 and A3:

Pressure at W1 ($P_{W1}$);
Temperature at W1 ($T_{W1}$);
Volumetric flow rate at W1 ($F_{W1}$);
Temperature at A3 ($T_{A3}$);
Volumetric flow rate at A3 ($F_{A3}$);
Relative humidity at A3 ($\phi_{A3}$); and
Pressure at A3 ($P_{A3}$).

These properties can be measured directly or indirectly. Examples of indirect measurements include measuring mass, which will determine volume, and measuring the humidity ratio, which will dictate the relative humidity.

The following thermophysical properties of these two points are evaluated 84 in the next step:

$\rho_{W1}$=density of water at $T_{W1}$, $P_{H1}$;
$\rho_{A3}$=density of moist air at $T_{A3}$, $\phi_{A3}$;
$\omega_{A3}$=humidity ratio at $T_{A3}$, $\phi_{A3}$;
$\omega_{A4,min}$=humidity ratio at saturation, $T_{W1}$;
$h_{w,W2,max}$=enthalpy of water at $T_{A3}$, $P_{W1}$;
$h_{w,W1}$=enthalpy of water at $T_{W1}$, $P_{W1}$;
$h_{da,A3}$=enthalpy of dry air at $T_{A3}$, $P_{A3}$;
$h_{da,A4,min}$=enthalpy of dry air at $T_{W1}$, $P_{A3}$;
$h_{v,A3}$=enthalpy of water vapor at $T_{A3}$, $P_{A3}$;
$h_{v,A4,min}$=enthalpy of water vapor at $T_{W1}$, $P_{A3}$; and
$h_{fg,a3}$=enthalpy of vaporization at $T_{A3}$, $P_{A3}$.

From these values, the mass flow rates, $\dot{m}$, were calculated 86 as follows:

$\dot{m}_{H1}=\rho_{H1} \times F_{W1}$;

$\dot{m}_{A3}=\rho_{A3} \times F_{A3}$;

$\dot{m}_{da,A3}=\dot{m}_{A3}/(1+\omega_{A3})$;

The modified heat capacity ratio, $HCR_d$, in the bubble column dehumidifier is then calculated 88 according to the following equation:

$$HCR_d = \frac{\dot{m}_{W1}}{\dot{m}_{da,A3}} \times \frac{(h_{w,W2,max} - h_{w,W1})}{(h_{da,A3} - h_{da,A4,min}) + \omega_{A4,min}} \\ (h_{v,A3} - h_{v,A4,min}) + (\omega_{A3} - \omega_{A4,min})h_{fg,A3}$$

$HCR_d$ is compared 89 with the value 1. If $HCR_d$ is to be greater than 1, the flow rate of air is increased 90. If $HCR_d$ is less than 1, the flow rate of air is decreased 92. After waiting 94 for the system to reach steady operation, the process is repeated with the measurements 82. If $HCR_d$ is very close to 1 (within error due to measurements), then this is the optimal operating point for these conditions; and, after waiting 96 for a sampling time specified by the user, the process is repeated with the measurements 82.

In this embodiment, system specifications are as follows $T_{A1}=25°$ C.;
$T_{wb,A1}=25°$ C.;
$T_{B6}=90°$ C.;
$\dot{m}_{B4}=0.242$ kg/s;
$\dot{m}_{W2}=0.242$ kg/s;
$T_{B4}=30°$ C.;
humidifier height=3 m;
number of trays in condenser=6;
terminal temperature difference (TTD) in a first heat exchanger (HX1)=3° C.; and
TTD in chiller 75=5° C.

Results in the system from sequence of iterations (steps) of the process are presented in the following table:

| | step | | | | | | | | | |
|---|---|---|---|---|---|---|---|---|---|---|
| | 1 | 2 | 3 | 4 | 5 | 6 | 7 | 8 | 9 | 10 |
| $\dot{m}_A$ [kg/s] | 0.02 | 0.04 | 0.07 | 0.05 | 0.05 | 0.05 | 0.05 | 0.05 | 0.05 | 0.05 |
| $HCR_d$ [—] | 1.60 | 1.13 | 0.84 | 0.99 | 1.06 | 1.02 | 1.01 | 1.00 | 1.00 | 1.00 |
| GOR [—] | 1.47 | 1.82 | 1.79 | 1.90 | 1.88 | 1.90 | 1.91 | 1.91 | 1.90 | 1.91 |
| RR [—] | 0.06 | 0.07 | 0.07 | 0.07 | 0.07 | 0.07 | 0.07 | 0.07 | 0.07 | 0.07 |

Figure 8:
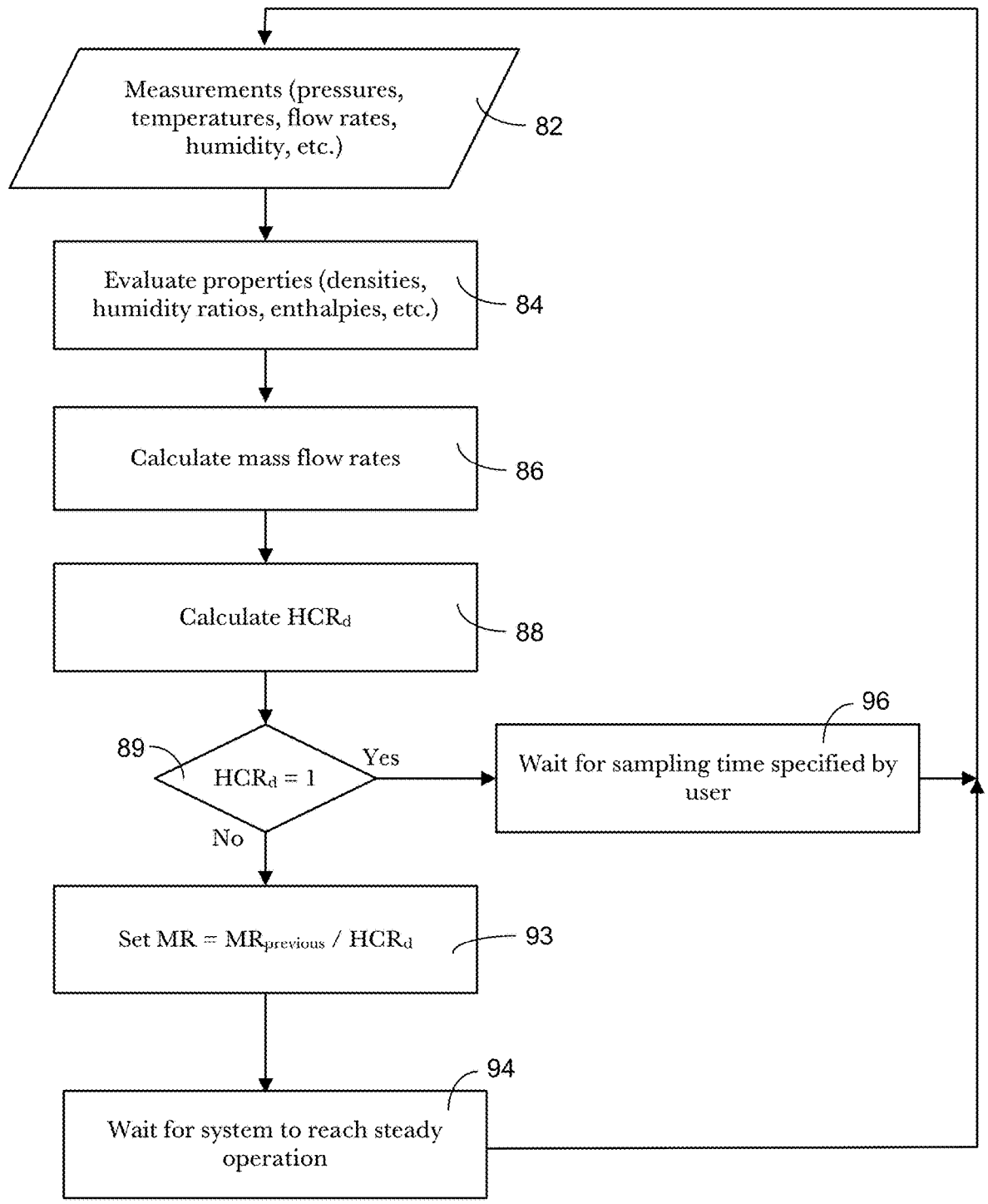
FIG. 8 is a flow chart for an HDH method with a single intermediate extraction.

Extra Detail on how to Increase or Decrease the Mass Flow Rate of Dry Air:

As shown in the specific flowchart of FIG. 8, the same procedure as is recited above is carried out through the calculation 88 of $HCR_d$. We then modify the mass flow rate ratio, MR, in step 93, such that (a) the new mass flow rate ratio, MR=(previous mass flow rate ratio, $MR_{previous}$)/(calculated $HCR_d$), or (b) if the mass flow rate of water is constant, the new mass flow rate of dry air=(previous mass flow rate of dry air)×(calculated $HCR_d$). The system then waits for steady state operation to be established in step 94.

Figure 9:
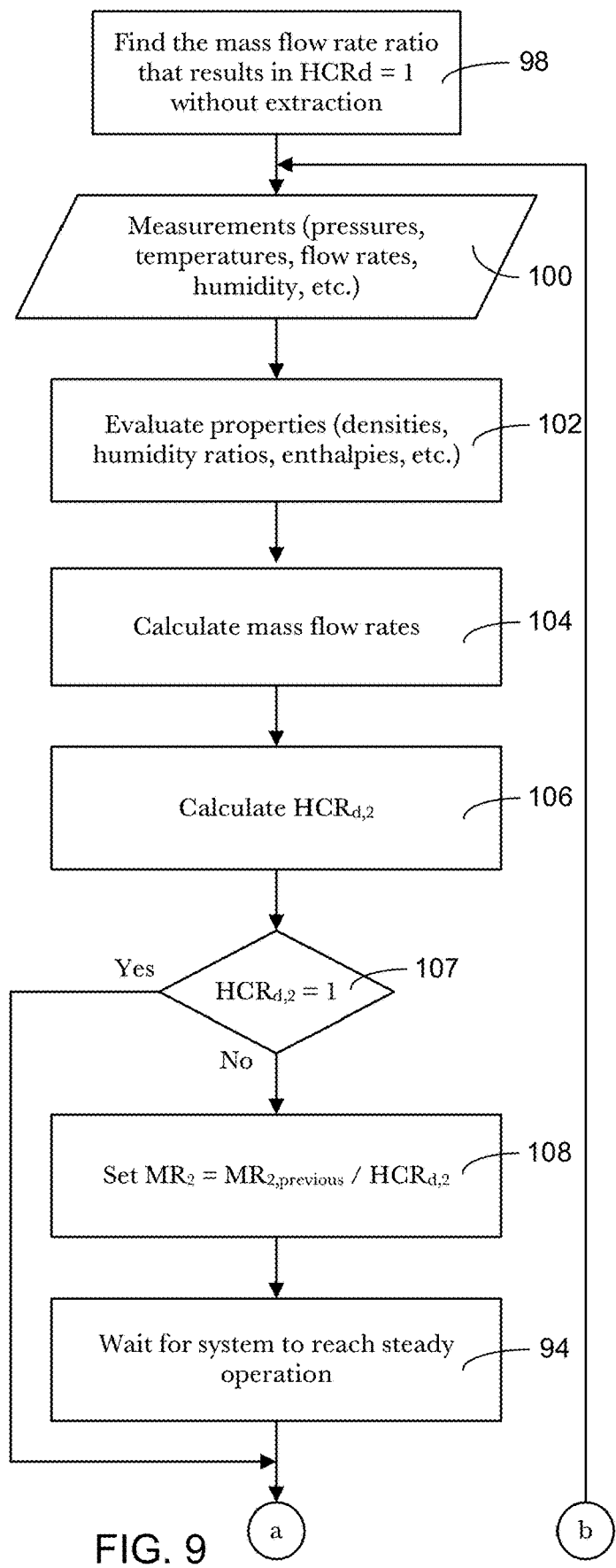
FIGS. 9 and 10 provide a flow chart for a two-stage HDH method using the apparatus of FIG. 6a with a single intermediate extraction
Figure 10:
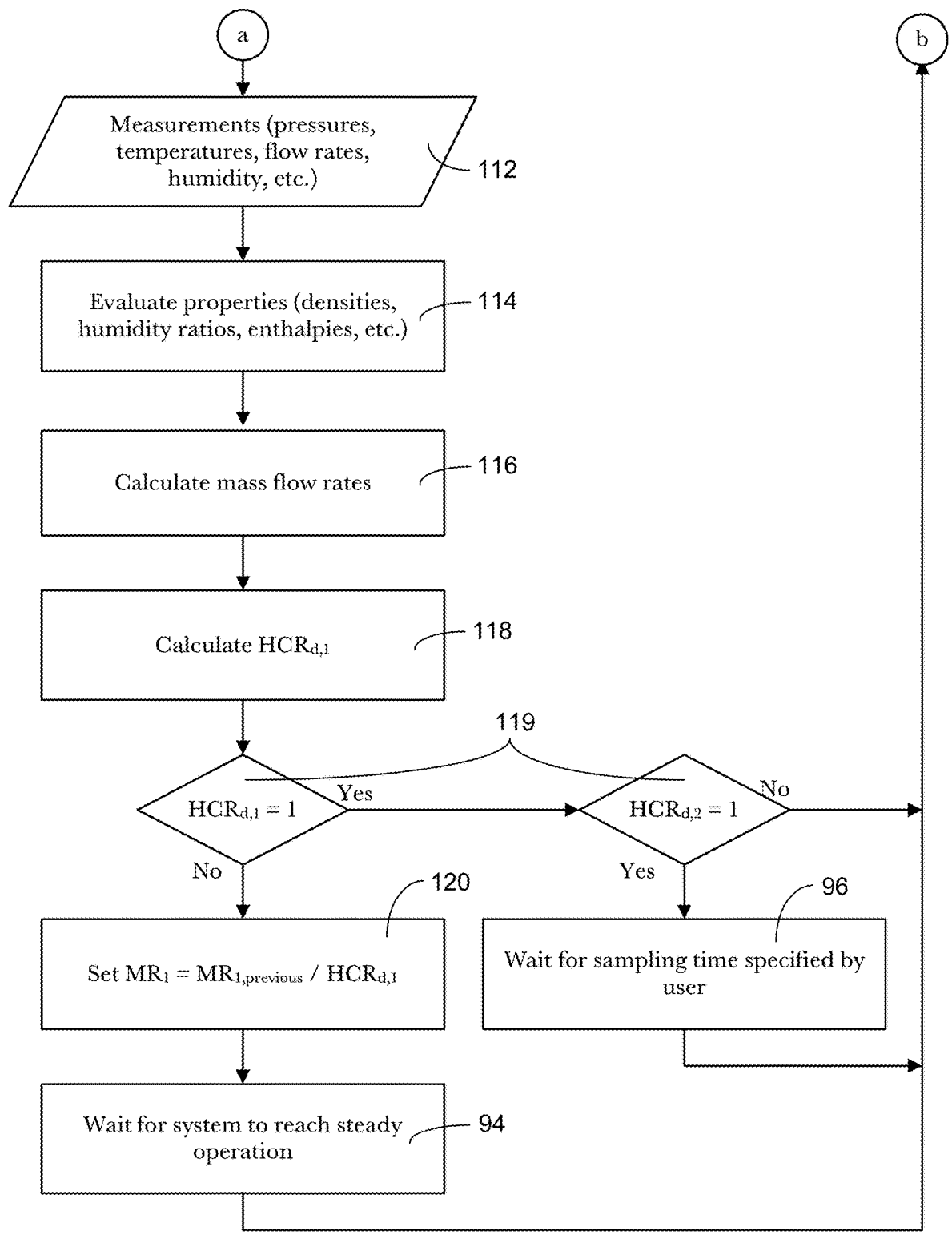

Control Algorithm for Two-Stage HDH (with a Single Extraction):

The flowchart of FIGS. 9 and 10 outlines a process for a two-stage humidification-dehumidification process with a single intermediate extraction between bubble-column stages in the humidifier (between stages 60 and 58) and the condenser (between stages 66 and 64), though the process can also be carried out with multiple extractions between additional stages in the humidifier 68 and condenser 70.

This exemplification is carried out with three trays in stage 66 and with three trays in stage 64. The height for each humidifier stage 58/60 is 1.5 meters.

First, the system is operated as a single stage (i.e., the extracted stream duct to intermediate conduit 72 is closed); and the algorithm, above, is used to find 98 the appropriate mass flow rate of air 62 such that $HCR_d=1$.

Next, the following measurements are taken 100 by sensors to determine the thermodynamic states of points W20 and A3:
  Pressure at W20 ($P_{W20}$);
  Temperature at W20 ($T_{W20}$);
  Volumetric flow rate at W20 ($F_{W20}$);
  Temperature at A3 ($T_{A3}$);
  Volumetric flow rate at A3 ($F_{A3}$);
  Relative humidity at A3 ($\phi_{A3}$); and
  Pressure at A3 ($P_{A3}$).

Next, the following thermophysical properties to determine the thermodynamic states of W20 and A3 are evaluated 102:
  $\rho_{W20}$=density of water at $T_{W20}$, $P_{W20}$;
  $\rho_{A3}$=density of moist air at $T_{A3}$, $\phi_{A3}$;
  $\omega_{A3}$=humidity ratio at $T_{A3}$, $\phi_{A3}$;
  $\omega_{A7,min}$=humidity ratio at saturation, $T_{W20}$;
  $h_{w,W2,max}$=enthalpy of water at $T_{A3}$, $P_{W20}$;
  $h_{w,W20}$=enthalpy of water at $T_{W20}$, $P_{W20}$;
  $h_{da,A3}$=enthalpy of dry air at $T_{A3}$; $P_{A3}$;
  $h_{da,A7,min}$=enthalpy of dry air at $T_{W20}$, $P_{A3}$;
  $h_{v,A3}$=enthalpy of water vapor at $T_{A3}$, $P_{A3}$;
  $h_{v,A7,min}$=enthalpy of water vapor at $T_{W20}$, $P_{A3}$; and
  $h_{fg,a3}$=enthalpy of vaporization at $T_{A3}$, $P_{A3}$.

From these values, the mass flow rates, $\dot{m}$, were calculated 104 as follows:

$$\dot{m}_{W20} = \rho_{W20} \times F_{W20};$$

$$\dot{m}_{A3} = \rho_{A3} \times F_{A3}; \text{ and}$$

$$\dot{m}_{da,A3} = \dot{m}_{A3}/(1+\omega_{A3}).$$

The modified heat capacity ratio, $HCR_{d,2}$, in the bubble column dehumidifier is then calculated 106 according to the following equation:

$$HCR_{d,2} = \frac{\dot{m}_{W1}}{\dot{m}_{da,A3}} \times \frac{(h_{w,W2,max} - h_{w,W1})}{(h_{da,A3} - h_{da,A4,min}) + \omega_{A7,min}(h_{v,A3} - h_{v,A7,min}) + (\omega_{A3} - \omega_{A7,min})h_{fg,A3}}.$$

$HCR_{d,2}$ is then compared 107 with the value, 1; and if $HCR_{d,2}$ is 1 (or within a margin of error of 1), the following additional measurements are taken in step 112:
  Pressure at W1 ($P_{W1}$);
  Temperature at W1 ($T_{W1}$);
  Volumetric flow rate at W1 ($F_{W1}$);
  Temperature at A8 ($T_{A8}$);
  Volumetric flow rate at A8 ($F_{A8}$);
  Relative humidity at A8 ($\phi_{A8}$); and
  Pressure at A8 ($P_{A8}$).

If $HCR_{d,2} \neq 1$, the mass flow rate ratio, MR, in the second (hot) stage 64 is modified 108 before step 112 such that the new mass flow rate ratio, $MR_2$=(previous mass flow rate ratio, $MR_{2,previous}$)/(calculated $HCR_{d,2}$).

Next, as shown in the flowchart of FIG. 10, which is a continuation of the flowchart of FIG. 9, the same procedure is performed on the cooler stage 66; i.e., the following properties are evaluated 114 to determine the thermodynamic states of points A8 and W1:
  $\rho_{W1}$=density of water at $T_{W1}$, $P_{W1}$;
  $\rho_{A8}$=density of moist air at $T_{A8}$, $\phi_{A8}$;
  $\omega_{A8}$=humidity ratio at $T_{A8}$, $\phi_{A8}$;
  $\omega_{A4,min}$=humidity ratio at saturation, $T_{W1}$;
  $h_{w,W20,max}$=enthalpy of water at $T_{A8}$, $P_{W1}$;
  $h_{w,W1}$=enthalpy of water at $T_{W1}$, $P_{W1}$;
  $h_{da,A8}$=enthalpy of dry air at $T_{A8}$, $P_{A8}$;
  $h_{da,A4,min}$=enthalpy of dry air at $T_{W1}$, $P_{A8}$;
  $h_{v,A8}$=enthalpy of water vapor at $T_{A8}$, $P_{A8}$;
  $h_{v,A4,min}$=enthalpy of water vapor at $T_{W1}$, $P_{A8}$; and
  $h_{fg,a8}$=enthalpy of vaporization at $T_{A8}$, $P_{A8}$.

From these values, the mass flow rates, $\dot{m}$, were calculated 116 as follows:

$$\dot{m}_{W1} = \rho_{W1} \times F_{W1};$$

$$\dot{m}_{A8} = \rho_{A8} \times F_{A8};$$

$$\dot{m}_{da,A8} = \dot{m}_{A8}/(1+\omega_{A8});$$

The modified heat capacity ratio, $HCR_d,i$, in the bubble column dehumidifier is then calculated 118 according to the following equation:

$$HCR_{d,1} = \frac{\dot{m}_{W1}}{\dot{m}_{da,A3}} \times \frac{(h_{w,W20,max} - h_{w,W1})}{(h_{da,A3} - h_{da,A4,min}) + \omega_{A7,min}(h_{v,A3} - h_{v,A4,min}) + (\omega_{A3} - \omega_{A4,min})h_{fg,A3}}.$$

$HCR_{d,1}$ and $HCR_{d,2}$ are compared 119 with the value 1; and if $HCR_{d,1} \neq 1$, the mass flow rate ratio in the first (cooler) stage 66 is modified 120 such that the new mass flow rate ratio, $MR_1$=(previous mass flow rate ratio, $MR_{1,previous}$)/(calculated $HCR_{d,1}$).

The process is repeated from the measurement 100 of properties of H20 and A3 until $HCR_{d,1}=HCR_{d,2}=1$ (or as close as possible), or until the change in the gained output ratio (GOR) and recovery ratio (RR) between iterations becomes negligible.

Results in the system from sequence of iterations (steps) of the process are presented in the following table:

| | step | | | | | |
|---|---|---|---|---|---|---|
| | 1 | 2 | 3 | 4 | 5 | 6 |
| $\dot{m}_{A1}$ [kg/s] | 0.05 | 0.05 | 0.12 | 0.12 | 0.12 | 0.12 |
| $\dot{m}_{A3}$ [kg/s] | 0.05 | 0.03 | 0.03 | 0.03 | 0.03 | 0.03 |
| $HCR_{d,1}$ [—] | 1.41 | 2.42 | 0.96 | 0.96 | 0.99 | 0.99 |
| $HCR_{d,2}$ [—] | 0.62 | 1.14 | 0.97 | 0.99 | 0.99 | 1.00 |
| GOR [—] | 1.93 | 1.77 | 2.24 | 2.24 | 2.24 | 2.24 |
| RR [—] | 0.07 | 0.07 | 0.08 | 0.08 | 0.08 | 0.08 |

In the above table and elsewhere herein, [-] indicates a non-dimensional number.

Exemplification

Process Optimization Equations for Humidification-Dehumidification (HDH)

The following equations can be used for process optimization in a humidification-dehumidification cycle for producing fresh water and/or for concentrating and removing contaminants from an aqueous composition using the apparatus of FIG. 6a (and referencing the flow streams shown in FIG. 6a in the subscripts of the variables).

The thermodynamic balancing of the preheater 54 (where $c_{p,W2}$ is the specific heat in the hot stage) can be expressed as follows:

$$\dot{m}_{W2} = \dot{m}_{B5} \cdot c_{P,B4} \cdot \frac{1}{c_{P,W2}} \text{ [kg/s]}. \quad (12)$$

The non-dimensional number for the heat capacity ratio (HCR) for the hot humidifier stage 58 (where WB is the wet bulb temperature and where the hot stage 58 is referenced as H2) can be expressed as follows:

$$\frac{\dot{m}_{da,A3}(h_{B6} - h_{A2})}{\dot{m}_{B5} \cdot c_{P,B4} \cdot T_{B6} - \dot{m}^*_{B20} \cdot c_{P,B4} \cdot WB_{A2}} = HCR_{H2}[-]. \quad (13)$$

The non-dimensional number for the cold humidifier stage 60, referenced as H1, can be expressed as follows:

$$\frac{\dot{m}_{da,A1}(h_{B20} - h_{A1})}{\dot{m}_{B20} \cdot c_{P,B4} \cdot T_{B20} - \dot{m}_{B3} \cdot c_{P,B4} \cdot WB_{A1}} = HCR_{H1}[-]. \quad (14)$$

The non-dimensional numbers for the hot and cold stages 64 and 66 of the bubble column condenser 70 can be expressed as follows:

$$\frac{\dot{m}_{W1}(h_w \mid T_{AB} - h_w \mid T_{W1})}{\dot{m}_{da,A1}[(h_{ma} \mid T_{A8} - h_{ma} \mid T_{W1}) - (\omega \mid T_{A8} - \omega \mid T_{W1})h_w \mid T_{A8}]} = HCR_{D1}[-]; \text{ and} \quad (15)$$

$$\frac{\dot{m}_{W1}(h_w \mid T_{AB} - h_w \mid T_{W1})}{\dot{m}_{da,A3}[(h_{ma} \mid T_{A3} - h_{ma} \mid T_{W20}) - (\omega \mid T_{A3} - \omega \mid T_{W20})h_w \mid T_{A3}]} = HCR_{D2}[-], \quad (16)$$

where D1 represents the first stage 66 of the condenser 70, and where D2 represents the second stage 64 of the condenser 70.

The optimal system conditions for the cold stage 66 of bubble-column condenser 70 can be expressed as follows:

$$HCR_{D1}=1[-] \text{ at steady state.} \quad (17)$$

Finally, the optimal system conditions for the hot stage 64 of the bubble-column condenser 70 can be expressed as follows:

$$HCR_{D2}=1[-] \text{ at steady state.} \quad (18)$$

Figure 11:
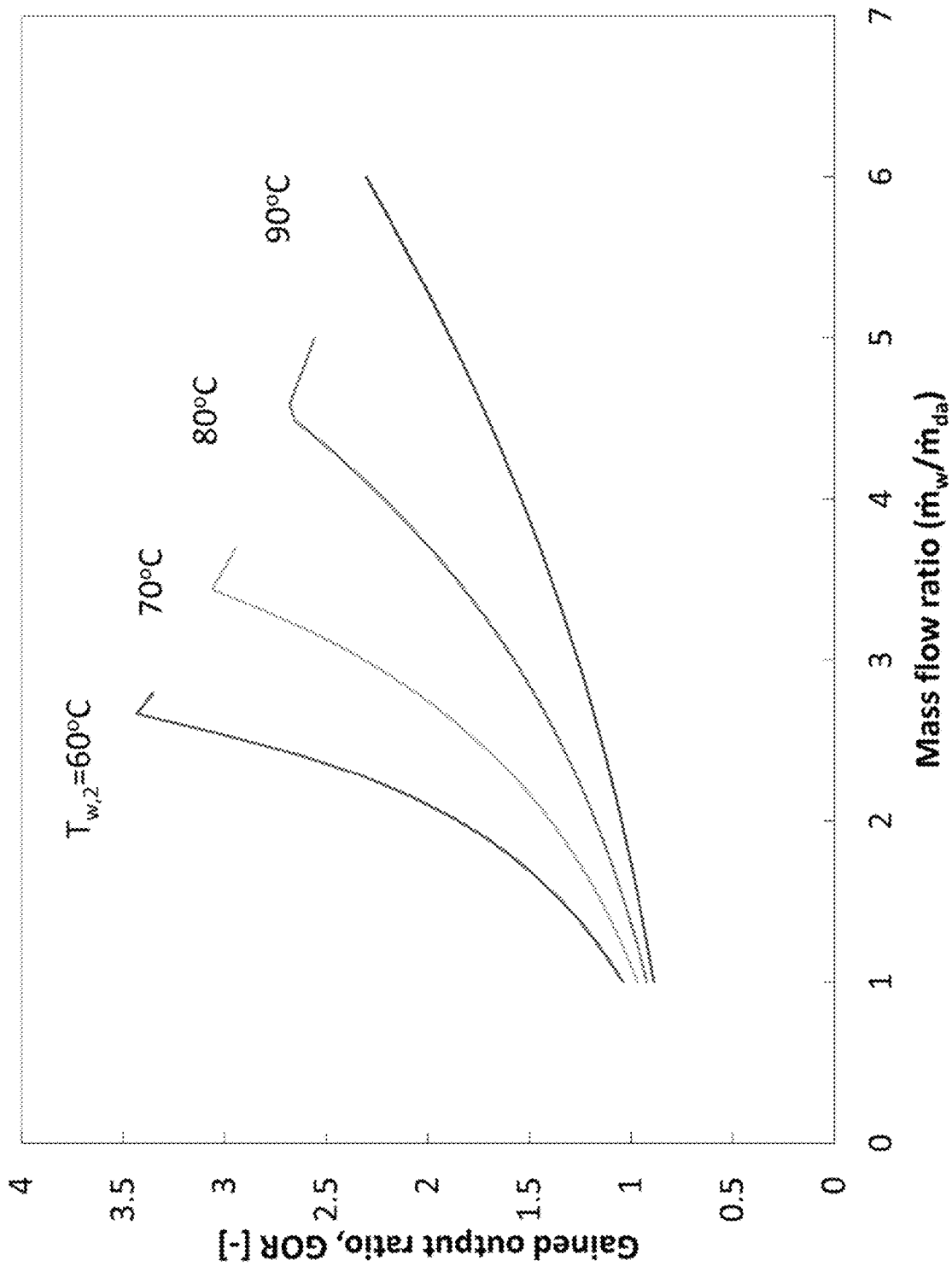
FIG. 11 is a plot of the gained output ratio (GOR) as a function of the mass flow ratio at different water temperatures for an example of the method.

FIG. 11 shows the results of a programmed simulation. GOR is a metric for the energy cost of the water produced and is defined as (mass rate of water produced)/(power required to clean the water). The power in this equation is expressed as a mass rate of steam consumed [(mass rate of steam)=(thermal energy consumed in the desalination process)/(latent heat of boiling for water)]. Consequently, a higher GOR results in more efficient operation of the system.

Specifically, FIG. 11 is a graphical demonstration of the effects of balancing. Each line represents a different peak brine temperature. The peak in each line demonstrates that for every peak brine temperature, there exists an optimal mass flow ratio. Furthermore, each of these mass flow ratios is unique for the peak brine temperature.

Figure 12:
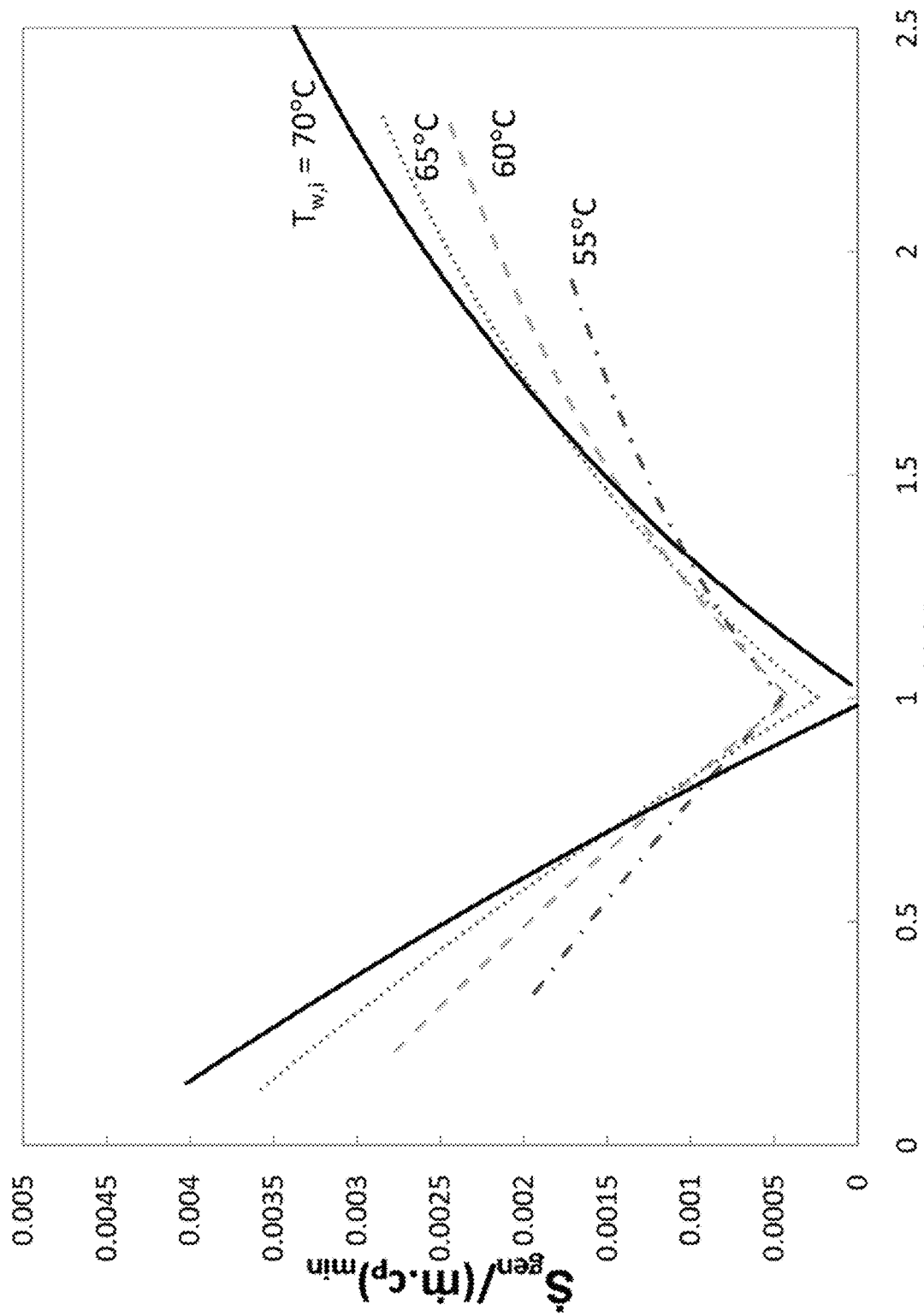
FIG. 12 is a plot of the non-dimensional rate of entropy generation as a function of the heat capacity ratio for an example of the method.

FIG. 12 is a result from a similar simulation and demonstrates that entropy generation is minimized when HCR is equal to 1, regardless of the temperature of the inlet stream. This result is significant because past research in humidification-dehumidification had shown the existence of optimal mass flow ratios but also indicated that each of these optimal ratios was unique to a set of temperature conditions. HCR is a more suitable metric than mass flow ratio for defining the balanced condition of a heat and mass exchanger because the balanced HCR value is always the same (i.e., 1).

Automated Control System

The systems and methods of this disclosure (including controlling the flows of the fluids through the system) can be implemented using a computing system environment. Examples of well-known computing system environments and components thereof that may be suitable for use with the systems and methods include, but are not limited to various forms of automated controllers, such as microcontrollers, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like. Typical computing system environments and their operations and components are described in many existing patents (e.g., U.S. Pat. No. 7,191,467, owned by Microsoft Corp.).

The methods may be carried out via non-transitory computer-executable instructions, such as program modules. Generally, program modules include routines, programs, objects, components, data structures, and so forth that perform particular tasks or implement particular types of data. The methods may also be practiced in distributed computing environments where tasks are performed by remote processing devices that are linked through a communications network. In a distributed computing environment, program modules may be nontransitorally stored in both local and remote computer storage media including memory storage devices.

The systems and methods of this disclosure may utilize a computer (e.g., in the form of a microcontroller) to carry out the processes described herein. Components of the computer may include, but are not limited to, a computer processor, a computer storage medium serving as memory, and coupling of components including the memory to the computer processor. A microcontroller is a small computer including a single integrated circuit containing a processor core, non-transitory computer storage media (memory), and programmable input/output peripherals and can be used as an embedded system. The microcontroller memory can include both permanent (nonvolatile) read-only memory (ROM) storing pre-programmed software in the form of a compact machine code as well as volatile read-write memory for temporary data storage. The microcontroller can also include an analog-to-digital converter if the light detector to which it is electronically coupled transmits its illumination data in analog format as well as a programmable interval timer to control, e.g., the duration of activation of the indicator LED's.

The various processes described in the descriptions of this disclosure can be encoded as software instructions in memory and executed by a processor to carry out the processes.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A humidification-dehumidification device, comprising:
   a humidifier including a carrier-gas inlet, a carrier-gas outlet, a feed-liquid inlet, and a brine outlet, wherein the humidifier is configured to transfer a vaporized component from feed liquid that is input through the feed-liquid inlet to carrier gas that is input through the carrier-gas inlet in counter-flow to the feed liquid;
   a condenser including a carrier-gas inlet, a carrier-gas outlet, a liquid inlet for condensing bath liquid, and a liquid outlet for the condensing bath liquid and condensate, wherein the condenser is configured to transfer the vaporized component from the carrier gas input through the carrier-gas inlet as a condensate to the condensing bath liquid in counter-flow to the condensing bath liquid;
   a carrier-gas conduit connecting the carrier-gas outlet of the humidifier with the carrier-gas inlet of the condenser;
   sensors for detecting at least one of the following state variables in the carrier-gas conduit at the carrier-gas inlet of the humidifier, at the liquid inlet and outlet of the condenser, and at the feed-liquid inlet and brine outlet of the humidifier: temperature, pressure and concentration;
   a condensing-bath-liquid flow-rate sensor configured to detect a flow rate of the condensing-bath liquid at at least one of the liquid inlet and the liquid outlet;
   a carrier-gas flow-rate sensor configured to detect a flow rate of the carrier gas through the humidification-dehumidification device;
   at least one carrier-gas flow controller configured to control the flow of carrier gas in the carrier-gas conduit;
   at least one liquid-flow controller configured to control the flow of at least one of the feed liquid through the humidifier and the condensing bath liquid through the condenser; and
   an automated controller comprising computer readable memory in communication with a processor, wherein the sensors and the flow controller are in communication with the automated controller, and wherein the computer readable medium stores software code for:
   generating and communicating commands to the carrier-gas flow controller to flow carrier gas through the humidifier and condenser;
   generating and communicating commands to the liquid-flow controller to control flow, in cross-flow to the carrier gas flow, of at least one of (a) feed liquid through the humidifier and (b) condensing bath liquid through the condenser;
   calculating ideal changes in total enthalpy rates of the carrier gas and at least one of the feed liquid and the condensing bath liquid in at least one of the humidifier and the condenser based on at least one state variable communicated by the sensors to the automated controller and the difference between the ideal changes in total enthalpy rates;
   identifying a change in flow rate of at least one of the carrier gas, the feed liquid, and the condensing bath liquid in at least one of the humidifier and the condenser that will bring the ideal change in total enthalpy rates of the carrier gas and at least one of the condensing bath liquid and the feed liquid closer to zero; and
   generating and sending commands to at least one of the carrier-gas flow controller and the at least one liquid-flow controller to control the mass flow of at least one of the carrier gas, the feed liquid, and the condensing bath liquid to achieve the identified change in flow rate to bring the ideal change in total enthalpy rates of the carrier gas and at least one of the feed liquid and the condensing bath liquid through at least one of the humidifier and the condenser closer to being equal.

2. The humidification-dehumidification device of claim 1, wherein at least one liquid-flow controller is configured to control flow of the condensing-bath liquid through the condenser, the humidification-dehumidification device further comprising:
   a first liquid conduit coupled with the liquid inlet of the condenser; and
   a second liquid conduit coupled with the liquid outlet of the condenser, wherein
   sensors for detecting at least one of the state variables are in at least one of the first and second liquid conduits, and
   wherein the software code includes instructions for calculating a heat capacity ratio based on a detected state variable in at least one of the first or second liquid conduit and generating and sending commands to the liquid flow controller to control the flow of the condensing bath liquid as a function of the calculated heat capacity ratio.

3. The humidification-dehumidification device of claim 2, wherein at least one of the condenser and the humidifier includes a plurality of stages, and wherein at least one sensor for detecting a state variable is mounted between stages, the device further comprising:
   an intermediate exchange conduit connecting intermediate in the condenser and humidifier;

a sensor for detecting a state variable in the intermediate exchange conduit; and a flow-rate sensor for detecting the flow rate of fluid in the intermediate exchange conduit;

a flow controller for controlling the flow of fluid through the intermediate exchange conduit between the humidifier and condenser, wherein the software code includes instructions for calculating the heat capacity ratio based on a detected state variable in the intermediate exchange conduit.

4. The humidification-dehumidification device of claim 3, wherein the stages comprise bubble columns through which at least one of the fluids can be bubbled.

5. The humidification-dehumidification device of claim 1, wherein the commands generated by the software code calculate a ratio of the change in idealized enthalpy difference of water as the condensing bath liquid and the idealized enthalpy difference of air as the carrier gas.

6. The humidification-dehumidification device of claim 5, wherein the software code includes instructions for calculating the ratio based on the state variable measurements from the sensors and on the flow-rate measurements from the flow-rate sensors and for sending commands to change the flow rate of at least one of the fluids as a function of the calculated ratio.

7. The humidification-dehumidification device of claim 6, wherein the software code includes instructions for iteratively calculating the ratio and sending commands to change the flow rate if the ratio is not within a specified margin of error of 1.

* * * * *